(12) United States Patent
Cremon

(10) Patent No.: US 12,200,009 B2
(45) Date of Patent: Jan. 14, 2025

(54) REMOTE ACCESS WITH MAN-IN-THE-MIDDLE ATTACK-PREVENTION

(71) Applicant: Axis AB, Lund (SE)

(72) Inventor: Jonas Cremon, Lund (SE)

(73) Assignee: Axis AB, Lund (SE)

( * ) Notice: Subject to any disclaimer, the term of this patent is extended or adjusted under 35 U.S.C. 154(b) by 272 days.

(21) Appl. No.: 18/078,354

(22) Filed: Dec. 9, 2022

(65) Prior Publication Data

US 2023/0188562 A1 Jun. 15, 2023

(30) Foreign Application Priority Data

Dec. 14, 2021 (EP) ..................................... 21214231

(51) Int. Cl.
*H04L 29/06* (2006.01)
*H04L 9/32* (2006.01)
*H04L 9/40* (2022.01)

(52) U.S. Cl.
CPC ........ *H04L 63/1466* (2013.01); *H04L 9/3213* (2013.01); *H04L 9/3247* (2013.01); *H04L 63/0428* (2013.01); *H04L 63/0876* (2013.01); *H04L 63/166* (2013.01)

(58) Field of Classification Search
CPC . H04L 9/3247; H04L 9/3213; H04L 63/0428; H04L 63/0876
See application file for complete search history.

(56) References Cited

U.S. PATENT DOCUMENTS

| | | | |
|---|---|---|---|
| 9,112,840 B2 | 8/2015 | Johnston et al. | |
| 10,298,404 B1 | 5/2019 | Behm et al. | |
| 10,868,802 B2 | 12/2020 | Westerlund et al. | |
| 11,100,197 B1* | 8/2021 | Bernardi | H04L 9/14 |
| 2015/0172064 A1 | 6/2015 | Takenaka et al. | |
| 2016/0072778 A1 | 3/2016 | Panton | |
| 2017/0099301 A1* | 4/2017 | Zhang | H04L 9/3247 |
| 2019/0245886 A1 | 8/2019 | Johns et al. | |

OTHER PUBLICATIONS

Corre, "User controlled trust and security level of Web real-time communications." (2018).
De Groef, et al., "Ensuring endpoint authenticity in WebRTC peer-to-peer communication." 2103-2110. (2016).
Extended European Search Report dated May 30, 2022 for European Patent Application No. 21214231.9.

* cited by examiner

*Primary Examiner* — Evans Desrosiers
(74) *Attorney, Agent, or Firm* — Volpe Koenig

(57) ABSTRACT

A method of enabling a remote access to a first network device from a second network device includes the second device generating a data item signed by a network service trusted by the first device, and including a fingerprint of a public key of the second device. The signed data item is sent to the first device via a signalling service, SIGS, as part of a negotiation of terms for a peer-to-peer connection. The first device uses the received signed data item to verify that the terms it receives from the SIGS has not been tampered with by the SIGS, in order to prevent the SIGS from performing a Man-In-The-Middle attack. Various network devices and a network system are also provided.

15 Claims, 5 Drawing Sheets

REMOTE ACCESS WITH MAN-IN-THE-MIDDLE ATTACK-PREVENTION

FIELD OF INVENTION

The present disclosure relates to the field of remote network access. In particular, the present disclosure relates to securing of a remote network access when using an intermediate signaling service to negotiate a peer-to-peer connection between two network devices, as used in e.g., Web Real-Time Connect (WebRTC).

TECHNICAL BACKGROUND

Due to the complexity of the Internet, two network devices located on different networks may not always necessarily know how to connect to each other without using an intermediate signaling service. For example, if both network devices are already connected to a same signaling service but not to each other, the signaling service may be used to relay network connectivity information between the two network devices such that the two devices may negotiate the terms of, and finally establish, their own peer-to-peer connection.

However, the intermediate signaling service may form part of an attack surface for a so-called man-in-the-middle (MITM) attack. If the signaling service has been compromised by a third party, the network connectivity information relayed between the network devices can be tampered with such that e.g., one device is tricked into connecting to a network point controlled by the third party instead of directly to the other network device, while still believing that it is in fact connecting directly to the other network device. By so doing, the alleged peer-to-peer connection between the two network devices may secretly be relayed via the signaling service, and the third party may then access or even alter potentially sensitive data sent between the network devices.

One real-world example of the above may for example be a user attempting to remotely access a network camera using WebRTC, wherein a signaling service is often required to exchange data between the user and the network camera before a direct peer-to-peer connection can be established. By compromising the signaling service, the third party can gain access to e.g., a video feed from the camera, without either the network camera or the user being aware of the ongoing intrusion.

SUMMARY

To at least partially solve the above identified problems of potential MITM attacks when relying on an intermediate signaling service to establish a peer-to-peer connection, the present disclosure provides an improved method of enabling a remote network access to a first network device from a second network device, various improved network devices, as well as an improved network system as defined in the accompanying independent claims. Other aspects also provide various improved computer programs and computer program products. Various alternative embodiments are defined in the dependent claims.

According to a first aspect of the present disclosure, a method of enabling a remote network access to a first network device from a second network device is provided. The method includes a step a) of the second network device generating a data item including at least one of a public key of the second network device and a fingerprint of the public key. The method includes a step b) of the second network device using a network service to cryptographically sign the data item to generate a corresponding first signed data item, wherein that the first signed data item is signed by the network service is verifiable by the first network device. The method includes a step c) of the first network device and the second network device performing, via an intermediate signaling service (SIGS) a negotiation of terms for establishing a peer-to-peer connection (between the first network device and the second network device), including the second network device sending, in one or more messages to the SIGS, the first signed data item and a first network address for contacting the second network device. The negotiation further includes the first network device receiving, in one or more messages from the SIGS, a second signed data item and a second network address. The method further includes a step d) of the first network device enabling the remote network access from the second network address over the peer-to-peer connection using the negotiated terms, but only after first d-i) verifying that the second signed data item (received from the SIGS) is signed by the network service, and d-ii) using the second signed data item to verify that the second network address (received from the SIGS) originates from the second network device (i.e., is the first network address for contacting the second network device) and has not been tampered with by the SIGS.

As used herein, a "fingerprint" of something (e.g., a message) may for example be the result of a particular hash-function applied to the message. In general, a "fingerprint" is considered to be anything which may be easily confirmed/checked as originating from a message once the fingerprint and the message is known, but such that the message may not be retrieved from the fingerprint alone.

As used herein, a peer-to-peer connection between two network devices may either be direct or indirect, wherein the latter includes the possibility to use one or more intermediate proxy servers to establish the peer-to-peer connection if a direct path between the network devices cannot be established due to e.g., the presence of intermediate Network address translation (NAT) and/or firewall servers. Such an intermediate proxy server may for example be a so-called Traversal Using Relays around NAT (TURN) server, or similar. Phrased differently, "direct" is to be interpreted as "as direct as possible". However, as used herein, a true peer-to-peer connection is considered not to require sending, once the peer-to-peer connection has been established, any data thereof via the SIGS, although a successful MITM attack performed by the SIGS may result in the two network devices falsely believing that such a true peer-to-peer connection has still been properly established. The network service may for example be a service provided by a third party which is trusted by the first network device. Here, "trusted" may include e.g., the first network device at least having access to a public key of the network service, and that the network service signs a data item (such as a message, or e.g., a fingerprint of a message) using a corresponding private key. By so doing, the first network device can confirm that a received signed data item is in fact signed by the network service by verifying that the data item, its signature and the public key are consistent. Examples of such public-key crypto/signing-systems are e.g., that by Rivest-Shamir-Adleman (RSA) and that of Elliptic-curve cryptography (ECC), although other equivalent or similar systems may of course also be used.

Herein, that a network address "originates from the second network device" is to be understood as that the network address is a same network address as originally proposed by the second network device during the negotiation of the terms for the peer-to-peer connection (e.g., a network address for contacting the second network device). Using the language of the claims, this means that the second network address (which the first network device receives from the SIGS) is the first network address (which the second network device sends to the SIGS). The network address does not need to point directly to the second network device, but may as well be e.g., an address of a network node on a path towards the second network device. It is, however, envisaged that the network address, in order to "originate from the second network device", should not be e.g., an address of the SIGS or to any network node controlled by the SIGS used to perform a MITM attack.

The present disclosure improves upon existing technology in that a "personal belonging" (i.e., a public key) of the second network device is signed and provided to the first network device as part of the terms-negotiation for the peer-to-peer connection. As the signature can be verified by the first network device, the SIGS may not tamper with the data item including the public key (or fingerprint of the public key) of the second network device. The public key can thus be used to verify also that the SIGS has not attempted to tamper with the negotiated terms of the peer-to-peer connection, including e.g., the network address proposed to the first network device for connecting to the second network device. This provides an easy way of preventing the SIGS performing a MITM attack, without requiring any substantial modifications to either the first network device or to the second network device. The first network device may, by using a pre-installed certificate, for example perform the validation of the signature of the network service without needing any connection established with e.g., another server at the moment the validation is performed.

In some embodiments, step d) may include the first network device partaking in an attempt to encrypt the peer-to-peer connection using a public key received from the second network address, and step d-i) may include the first network device verifying that the public key received from the second network address, and/or a fingerprint of the public key received from the second network address, is included in the second signed data item received from the SIGS (and e.g., is the public key of the second network device). This may be beneficial in that there is already a public key available for the second network device for the purpose of encryption, and in that this public key can be used also to prevent a MITM attack (without the need to generate any further public/private key-pair).

In some embodiments, encrypting the session may be performed using Datagram Transport Layer Security (DTLS). The public key received from the second network address may e.g., be a DTLS public key.

In some embodiments, the method may include the second network device signing at least a part of the one or more messages (including e.g., the first network address), and/or a fingerprint of the at least a part of the one or more messages sent to the SIGS (including e.g., the first network address), using a private key associated with a second public key of the second network device. Step d-ii) may include the first network device verifying that at least a part of the one or more messages received from the SIGS (including e.g., the second network address), and/or a fingerprint of the at least a part of the one or more messages received from the SIGS (including e.g., the second network address), has been signed using a private key associated with a public key included in the second signed data item. The second public key of the second network device may for example be the public key of the second network device included in the signed data item. It may also be envisaged that the signed data item includes multiple public keys of the second network device, wherein for example one such key is used for encrypting the peer-to-peer connection, while another such key is used to sign the at least a part of the one or more messages sent to the SIGS (including e.g., the first network address).

In some embodiments, the method may include providing the remote network access using Web Real-Time Connect (WebRTC, as recommended and published by the W3C). The one or more messages may include at least a Session Description Protocol (SDP) answer and/or offer. The network address (for contacting the second network device) may be an Interactive Connectivity Establishment (ICE) candidate, as used e.g., when negotiation how to traverse one or more NATs.

In some embodiments, the data item may also be, include, or be complemented by, an access token provided and also signed by the network service in order to authorize and/or authenticate the second network device. Step d) may include the first network device verifying that the access token is, is included in, or complements, the second signed data item received from the SIGS. This may e.g., help the first network device (which trusts the network service) to know whether the second network device should be able to remotely access the first network device at all, or at least to which extent. Here, "complemented by" should be understood as an option where the access token and data item are provided as two separately signed items.

According to a second aspect of the present disclosure, a network device is provided. This network device may for example be a network camera or similar. The network device includes a processor and a memory. The memory stores instructions. The instructions, when executed by the processor, cause the network device to negotiate terms for a peer-to-peer connection between the network device and a second network device (which may be for example a user device trying to access the network device), via an intermediate signaling service (SIGS), including to receive, in one or more messages from the SIGS, a signed data item and a network address (allegedly for contacting the second network device). The instructions further cause the network device to allow/enable a remote network access from the network address over the peer-to-peer connection using the negotiated terms, but including to first i) verify that the signed data item received from the SIGS is signed by a particular network service trusted by the network device, and also ii) use the signed data item received from the SIGS to verify that the network address received from the SIGS has not been tampered with by the SIGS (and e.g., is a network address for contacting the second network device).

In some embodiments, the instructions may further cause the network device to partake in an attempt to encrypt the peer-to-peer connection using a public key received from the network address, and to allow the remote network access from the network address after first also verifying that the public key received from the network address, and/or a fingerprint of the public key received from the network address, is included in the signed data item received from the SIGS.

In some embodiments, the instructions may further cause the network device to verify that at least a part of the one or more messages received from the SIGS including the network address, and/or that a fingerprint of the at least a part of the one or more messages received from the SIGS including the network address, has been signed using a private key associated with a public key included in the signed data item received from the SIGS.

According to a third aspect of the present disclosure, another network device is provided. This other network device may e.g., be a user device used to remotely access a network camera, such as e.g., a smartphone, a laptop, a desktop computer, a tablet, a wearable device, or similar. The network device includes a processor and a memory. The memory stores instructions. The instructions, when executed on the processor, causes the network device to generate a data item including at least one of a public key of the network device and a fingerprint of the public key. The instructions further cause the network device to use a network service to cryptographically sign the data item to generate a corresponding signed data item, wherein that the signed data item is signed by the network service is verifiable by a second network device (e.g., the network camera). The network service is trusted by the second network device. The instructions further cause the network device to negotiate terms for a peer-to-peer connection between the network device and the second network device via an intermediate signaling service (SIGS), including to send, in one or more messages to the SIGS, the signed data item and a network address for contacting the network device (as obtained using e.g., a STUN-server or similar).

In some embodiments, the instructions may further cause the network device to partake in an attempt to encrypt the peer-to-peer connection using the public key.

In some embodiments, the instructions may further cause the network device to sign at least a part of the one or more messages including the network address, and/or to sign a fingerprint of the at least a part of the one or more messages including the network address, using a private key associated with the public key.

In some embodiments, the instructions may further cause the network device to use the network service to let the signed data item be, include, or be complimented by, an access token signed by the network service to authorize and/or authenticate the network device to the second network device.

According to a fourth aspect of the present disclosure, a network system is provided. The network system includes a first network device (such as e.g., a network device according to the second aspect) and a second network device (such as e.g., a network device according to the third aspect). The network system is configured to enable a remote access to the first network device from the second network device according to a method according to the first aspect.

In some embodiments, the first network device may be a network camera. The remote network access may include streaming a video feed from the network camera to the second network device.

According to a fifth aspect, one or more computer programs are provided. The computer programs are each configured to cause, when executed by e.g., a processor of a network device according to the second and/or third aspect, cause the network device to perform relevant parts of the method of the first aspect.

According to a sixth aspect, one or more computer program products are provided. Each computer program product includes a computer readable storage medium on which one or more computer programs according to the fifth aspect are stored.

Other objects and advantages of the present disclosure will be apparent from the following detailed description, the drawings and the claims. Within the scope of the present disclosure, it is envisaged that all features and advantages described with reference to e.g., the method of the first aspect are relevant for, apply to, and may be used in combination with also any feature and advantage described with reference to the network device of the second aspect, the network device of the third aspect, the network system of the fourth aspect, the computer program of the fifth aspect, and/or the computer program product of the sixth aspect, and vice versa.

BRIEF DESCRIPTION OF DRAWINGS

Exemplifying embodiments will now be described below with reference to the accompanying drawings, in which.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the Figures, the (absolute or relative) sizes of elements and regions may be exaggerated or understated vis-à-vis their true values for illustrative purposes and, thus, are provided to illustrate the general structures of the embodiments.

DETAILED DESCRIPTION

Figure 1A:
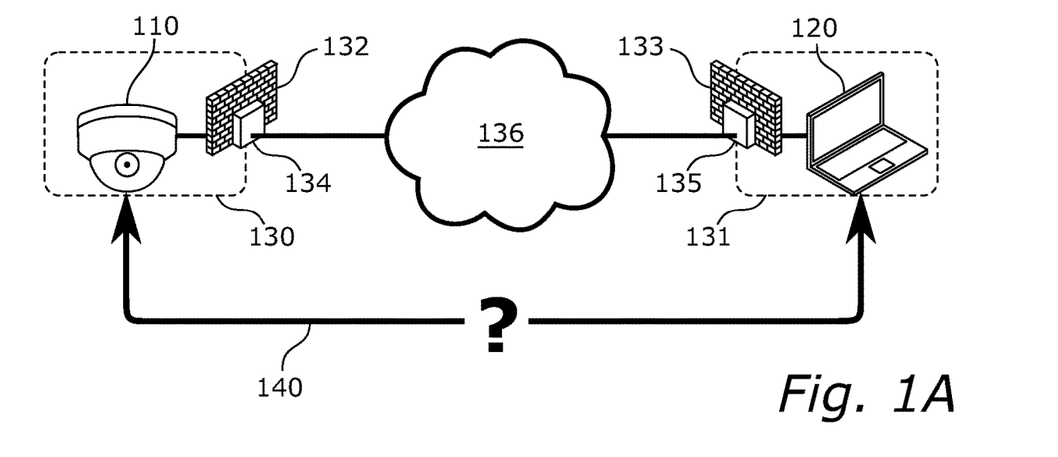
FIGS. 1A-1C schematically illustrate a conventional network system setup using an intermediate signaling service (SIGS)

FIG. 1A schematically illustrates a situation wherein two network devices may have difficulties to, on their own, establish a (direct) peer-to-peer connection. A first network device 110 and a second network device 120 wants to establish a peer-to-peer connection 140, such that the second network device 120 can remotely access the first network device 110 in order to e.g., perform a configuration of the first network device 110 and/or to e.g., receive a data stream from the first network device 110. As used herein, "a first network device" (e.g., the first network device 110) is assumed to be a network camera used e.g., for monitoring and/or surveillance, while "a second network device" (e.g., the second network device 120) is assumed to be a user device in form of a laptop. Other examples of second network devices (such as the laptop instead being a desktop computer, a smartphone, a tablet, a wearable device, etc.) are of course also possible and envisaged, but not illustrated further herein. A first network device may of course also be something else than a network camera, such as any network-connectable device to which a second network device may want a remote access.

The network camera 110 resides on a first local area network (LAN) 130, while the laptop 120 resides on a second LAN 131. The two LANs 130 and 131 are in turn connected through a common network 136 (such as e.g., the Internet). For reasons of e.g., security and/or network address management, the connection between the first LAN 130 and the common network 136 is not direct, but instead provided through e.g., a first firewall 132 and/or a first network address translation (NAT) device 134. The first firewall 132 may for example help to block unwanted incoming connection attempts (on e.g., certain network ports) to the first LAN 130, and the first NAT device 134 may for example serve to translate/map the network addresses of incoming and outgoing data packets between an address space used on the first LAN 130 and an address space used on the common network 136. This because the network address assigned to e.g., the network camera 110 on the first LAN 130 may be different than e.g., the network address of the first NAT 134 towards the common network 136. In a similar way, and for similar reasons, the second LAN 131 is connected through the common network 136 via e.g., a second firewall 133 and/or a second NAT device 135.

As a result of the above network configuration, the network camera 110 may not know on its own how to contact the laptop 120, and vice versa. Thus, establishing the peer-to-peer connection 140 may not be possible without further assistance.

Figure 1B:
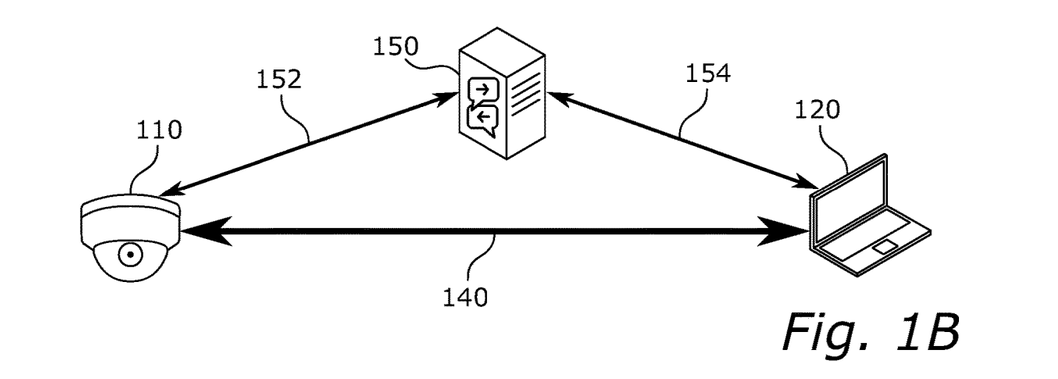

FIG. 1B schematically illustrates one commonly available solution for resolving this problem. It is here assumed that both the network camera 110 and the laptop 120 has each already established a connection with a so-called signaling service (SIGS) 150. The network camera 110 can thereby exchange messages with the SIGS 150 via the connection 152, while the laptop 120 can exchange messages with the SIGS 150 via the connection 154. The SIGS 150 can thus act as a relay between the network camera 110 and the laptop 120. For example, the laptop 120 may send a message to the SIGS 150 using the established connection 154. The SIGS 150 may take the same message and send it on further to the network camera 110 using the connection 152. By so doing, the network camera 110 and the laptop 120 may communicate indirectly via the SIGS 150, even when the network camera 110 and laptop 120 does not know on their own how to communicate directly with each other.

As the network camera 110 and the laptop 120 can (indirectly) communicate via the SIGS 150, the network camera 110 and the laptop 120 may then attempt to establish the direct peer-to-peer connection 140 by using the SIGS 150 to perform a negotiation of the terms for such a peer-to-peer connection. This negotiation may follow and use one or more standardized techniques and procedures, such as for example that of Session Traversal Utilities for NAT (STUN, published as RFC 5389 by the Internet Engineering Task Force, IETF), Traversal Using Relays around NAT (TURN, published as RFC 8656 by the IETF), Interactive Connectivity Establishment (ICE, published as RFC 8445 by the IETF), TCP Candidates with ICE (published as RFC 6544 by the IETF), etc. For example, the network camera 110 may contact a STUN server (not shown, but located outside the firewalls 132, 133 and NATS 134, 135, e.g., somewhere on the common network 136) in order to find what public IP address and port number that the first NAT 134 has allocated for network cameras 110 User Datagram Protocol (UDP) flows to remote hosts. This information may then be relayed to the laptop 120 via the SIGS 150 as an ICE candidate. Likewise, the laptop 120 may also contact a (potentially same) STUN server in order to get corresponding information about the configuration of the second NAT 135, and may provide this information to the network camera 110 via the SIGS 150. The network camera 110 and the laptop 120 may check whether the information received from the other party is useful (i.e., does the other party respond if contact is attempted using the received address information?). If not, the network camera 110 and/or laptop 120 may use e.g., the STUN server(s) to find other alternatives, and information between the network camera 110 and laptop 120 may be exchanged until both parties receives information useful to connect to the other party. It may of course also be envisaged that several plausible ICE candidates are obtained by a part at a same time, and transferred as alternatives in a single message to the other party, to potentially speed up the process of negotiation.

If a multimedia session is desired, in order to transfer e.g., video and/or audio between the network camera 110 and the laptop 120 once the peer-to-peer connection 140 has been established, the terms of such a session may be negotiated using e.g., the Session Description Protocol (SDP, published as RFC 8866 by the IETF), wherein an exchange of offers and corresponding answers is performed until terms acceptable for both the network camera 110 and the laptop 120 have been agreed upon. Such a negotiation may for example form part of the ICE negotiation, or be performed separately either before or after the ICE negotiation is finished. SDP-formatted messages may for example be used also for the ICE negotiation.

Finally, after the negotiation of terms has resulted in both the network camera 110 and the laptop 120 knowing how to contact the other party, the information received via the SIGS 150 can be used to establish the direct peer-to-peer connection 140 between the network camera 110 and the laptop 120, and a desired session may be established for transferring e.g., video data from the network camera 110 to the laptop 120, and/or for a remote access of the laptop 120 to the network camera 110.

It should be noted that the above outlined procedure of how to use the SIGS 150 to establish the peer-to-peer connection 140 is only one possible example, and that it is assumed that the skilled person is well familiarized with the process of terms negotiation for such connections and understands that other options are also possible. However, it is assumed that the SIGS 150 is needed as an intermediate between the network camera 110 and laptop 120 before the two are ready to establish the direct peer-to-peer connection 140. Also, a "direct" peer-to-peer connection should be interpreted as being as "direct as possible". The result of the negotiations may for example be that one or more intermediate proxy servers (such one or more TURN servers, or other types of servers) are needed as intermediates between the network camera 110 and the laptop 120. Importantly, however, is that a "true" peer-to-peer connection (whether direct or indirect) does not require further use of the SIGS 150 once the peer-to-peer connection 140 has been established. The SIGS 150 may, of course, however be used e.g., to reestablish a dropped peer-to-peer connection, or similar.

Figure 1C:
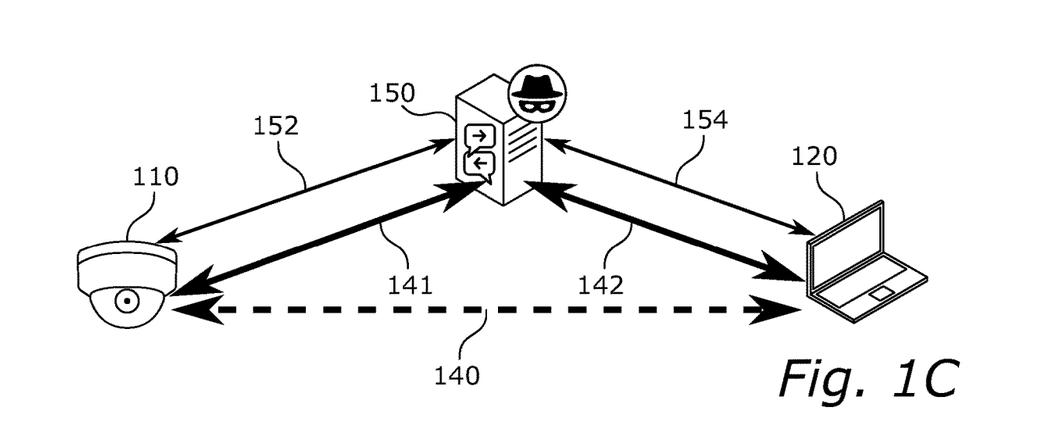

FIG. 1C schematically illustrates a potential problem with the above-described common solution using the intermediate SIGS 150. In the situation illustrated in FIG. 1C, the SIGS 150 has been compromised, e.g., hacked by a malicious party by introducing e.g., a certain software in the SIGS 150. Usually, the SIGS 150 only retrieves enough information from each incoming message to decide to what addressee the message is supposed to be relayed. The SIGS 150 is however usually not interested in the remaining contents of the messages it relays. However, after being compromised, the SIGS 150 may start to interfere with the messages, and even replace some or all information within a message before the message is relayed further to the receiving party.

For example, it may be envisaged that the laptop 120, as part of the terms negotiation, sends a message to the SIGS 150 including information about where the network camera 110 should connect to establish a (direct) peer-to-peer connection with the laptop 120. The SIGS 150 may notice this message, and replace the contact information of the laptop 120 (i.e., network address, port, etc.) in such a message with information of its own before the message is sent further to the network camera 110. The same may be the case for any similar message sent to the SIGS from the network camera 110 having the laptop 120 as the addressee. By tampering with the messages relayed between the network camera 110 and the laptop 120, the SIGS 150 may trick the network camera 110 to establish a peer-to-peer connection 141 directly with the SIGS 150 (instead of directly with the laptop 120). Likewise, the SIGS 150 may trick the laptop 120 to establish a peer-to-peer connection 142 directly with the SIGS 150 (instead of directly with the network camera 110). The SIGS 150 may then relay all incoming information from one part to the other party, such that the two parties (network camera 110 and laptop 120) can still believe that their respective peer-to-peer connections 141 and 142 are directly with the other party, without being aware of the assumed direct peer-to-peer connection 140 does not really exist and that all data is instead sent via the SIGS 150. This procedure is what is referred to as a Man-In-The-middle (MITM) attack, and may be harmful as the SIGS 150 and the malicious party may for example gain access to sensitive information (such as video monitoring feeds, or similar) sent from the network camera 110 to the laptop 120. The risk of a potential MITM attack may be increased in e.g., a situation when the SIGS 150 is not provided and/or operated by an owner of either one or both of the network camera 110 and laptop 120, but where a third-party service is used instead. Without having direct control of the SIGS 150, it may be harder for the owner of the network camera 110 and/or the laptop 120 to trust the SIGS 150 and to guarantee that the SIGS 150 does not tamper with the messages it relays.

The present disclosure provides an improved method of establishing a remote access from one network device to another, which allows to circumvent the above identified problem with MITM attacks. Exemplifying embodiments of such an improved method, as well as examples of envisaged improved network devices and improved network systems, will now be described more fully hereinafter with reference to the remaining Figures of the accompanying drawings. The drawings show currently preferred embodiments, but the disclosure may, however, be embodied in many different forms and should not be construed as limited to the embodiments set forth herein; rather, these embodiments are provided for thoroughness and completeness, and fully convey the scope of the present disclosure to the skilled person.

Figure 2A:
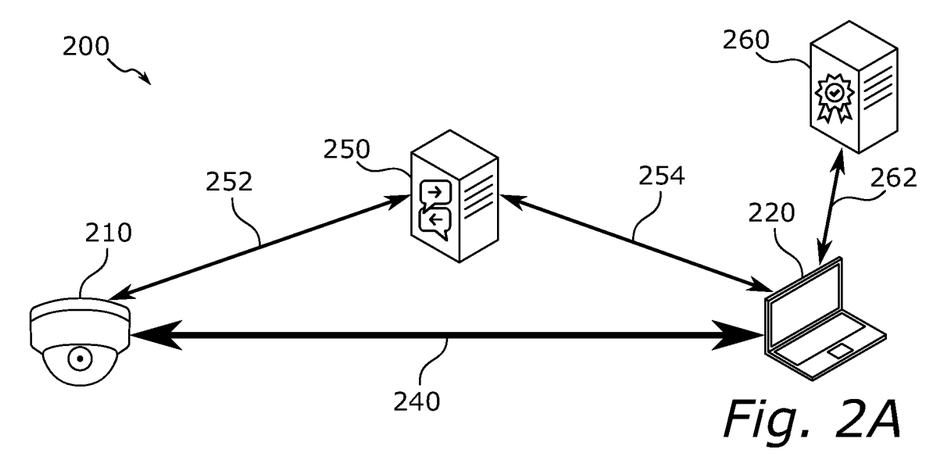
FIG. 2A schematically illustrates embodiments of a network system setup using an intermediate SIGS according to the present disclosure.

FIG. 2A schematically illustrates an embodiment of a network system 200 according to the present disclosure. A first network device 210 (here also in the form of a network camera) wants to establish a (direct) peer-to-peer connection 240 with a second network device 220 (here also in the form of a laptop), in order to enable a remote access of the laptop 220 to the network camera 210. As described earlier herein, the presence of one or more NATS, firewalls or similar items (not shown) in between the network camera 210 and the laptop 220 prevents the network camera 210 and the laptop 220 from establishing such a direct peer-to-peer connection on their own. Instead, the network camera 210 and the laptop 220 relies on an intermediate SIGS 250 to relay messages while the terms of the peer-to-peer connection are negotiated. The network camera 210 has an already established connection 252 to the SIGS 250, while the laptop 220 has an already established connection 254 to the SIGS 250. The SIGS 250 is not assumed to form part of the network system 200, but is instead operated by a third-party which may not necessarily be trusted (that is, it is not known by an owner of one or both of the network camera 210 and the laptop 220 whether the SIGS 250 has been compromised or not).

The envisaged network system 200 includes the use of another network service 260, which is used to sign data items and which is trusted at least by the network camera 210. Here, "trusted" implies that a signature of the network service 260 can be verified by the network camera 210, such that the network camera 210 may know if a particular data item has been signed by the particular network service 260 or not. This can be achieved by the network camera 210 having access to e.g., a public key of the network service 260, and in that the network service 260 uses a corresponding (i.e., part of a same key-pair) private key for signing the data item. Preferably, the public key of the network service 260 has been provided to the network camera 210 in advance, and is not sent together with the signed data item. By so doing, the SIGS 250 (if used to relay the signed data item) may not tamper with the signature of the network service 260 without the network camera 210 noticing, and the network camera 210 does not necessarily need an active network connection to the network service 260. By verifying the signature of a received data item, the network camera 210 can be sure that the content of the signed data item has not been tampered with by the SIGS 250.

Figure 2B:
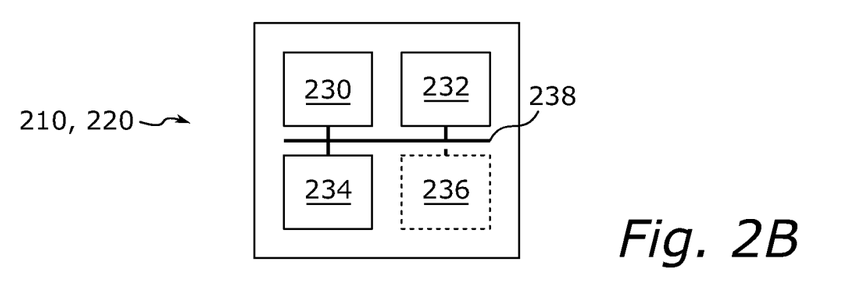
FIG. 2B schematically illustrates embodiments of network devices according to the present disclosure.

FIG. 2B schematically illustrate various embodiments of network devices 210, 220 according to the present disclosure. Each network device includes at least a processor 230 (or e.g., processing circuitry) and a memory 232. The memory 232 contains (i.e., stores) instructions, that when executed by the processor 230 causes the device to perform according to one of the various methods envisaged herein. For example, if the network device is the first network device 210 (e.g., a network camera), the instructions stored in the memory 232 may cause the first network device 210 to perform the relevant parts of one or more embodiments of a method 301 as will be described later herein with reference to FIG. 3B, and/or to perform the steps of one or more embodiments of a method 302 as will be described later herein with reference to FIGS. 3C, 3D and 3E. If the network device is the second network device 220, the instructions stored in the memory 232 may for example cause the second network device 220 to perform the relevant parts of the one or more embodiments of the method 301, and/or to perform the steps of one or more embodiments of a method 303 as will be described later herein with reference to FIG. 3F. Depending on what the network devices 210, 220 are each supposed to perform, they may include further, additional items 236 necessary for such performance. For example, if the first network device 210 is a network camera, the items 236 may include e.g., the camera and electronics related thereto, and the memory 232 may further store e.g., one or more instructions for the processor related to the functionality of such a camera. If the network device is the second network device 220 (e.g., a laptop), the additional items 236 may for example include a monitor for viewing a video stream received from a network camera, a keyboard for receiving user input, or similar, etc. To connect to a network, the network devices 210 and 220 may include a network interface 234, which may be e.g., a wireless interface supporting e.g., Wi-Fi (as defined in e.g., IEEE 802.11), and/or a wired interface supporting e.g., Ethernet (as defined in e.g., IEEE 802.3), or similar. A communication bus 238 may for example be provided to interconnect the various parts 230, 232, 234, and 236, such that these parts may communicate with each other as required to obtain a desired functionality.

Various embodiments of methods (as performed by/in the network system 200, and/or separately in each of the network camera 210 and the laptop 220) according to the present disclosure will now be described in more detail with reference to FIGS. 3A-3F. As stated before, the terms "first network device" and "network camera" are used interchangeably, while the same applies also to the terms "second network device" and "laptop", if not stated explicitly to the contrary.

Figure 3A:
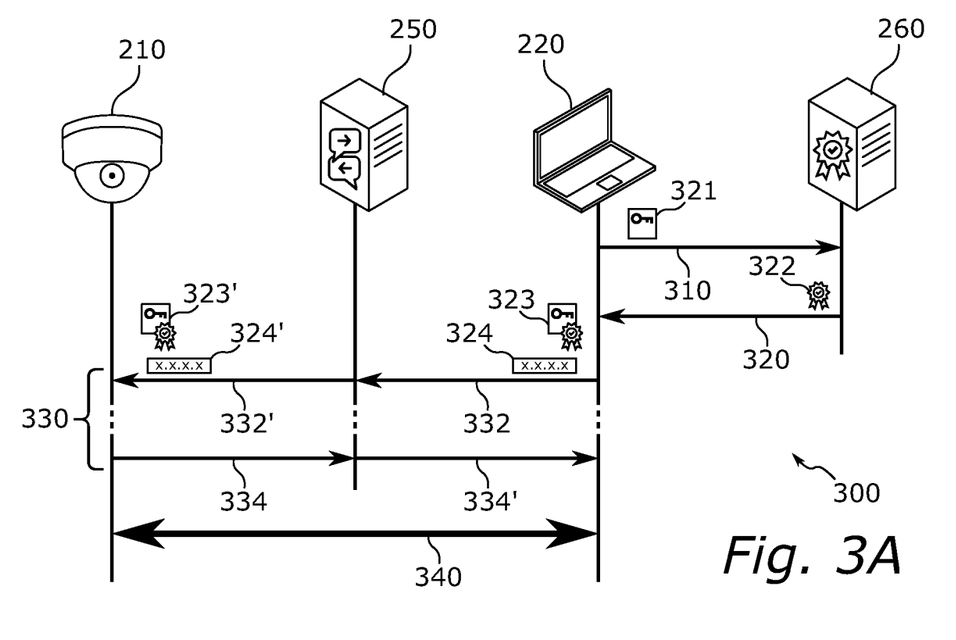
FIG. 3A schematically illustrates a flow of messages in embodiments of a method according to the present disclosure, and FIGS. 3B-3F schematically illustrate flows of embodiments of methods according to the present disclosure.
Figure 3B:
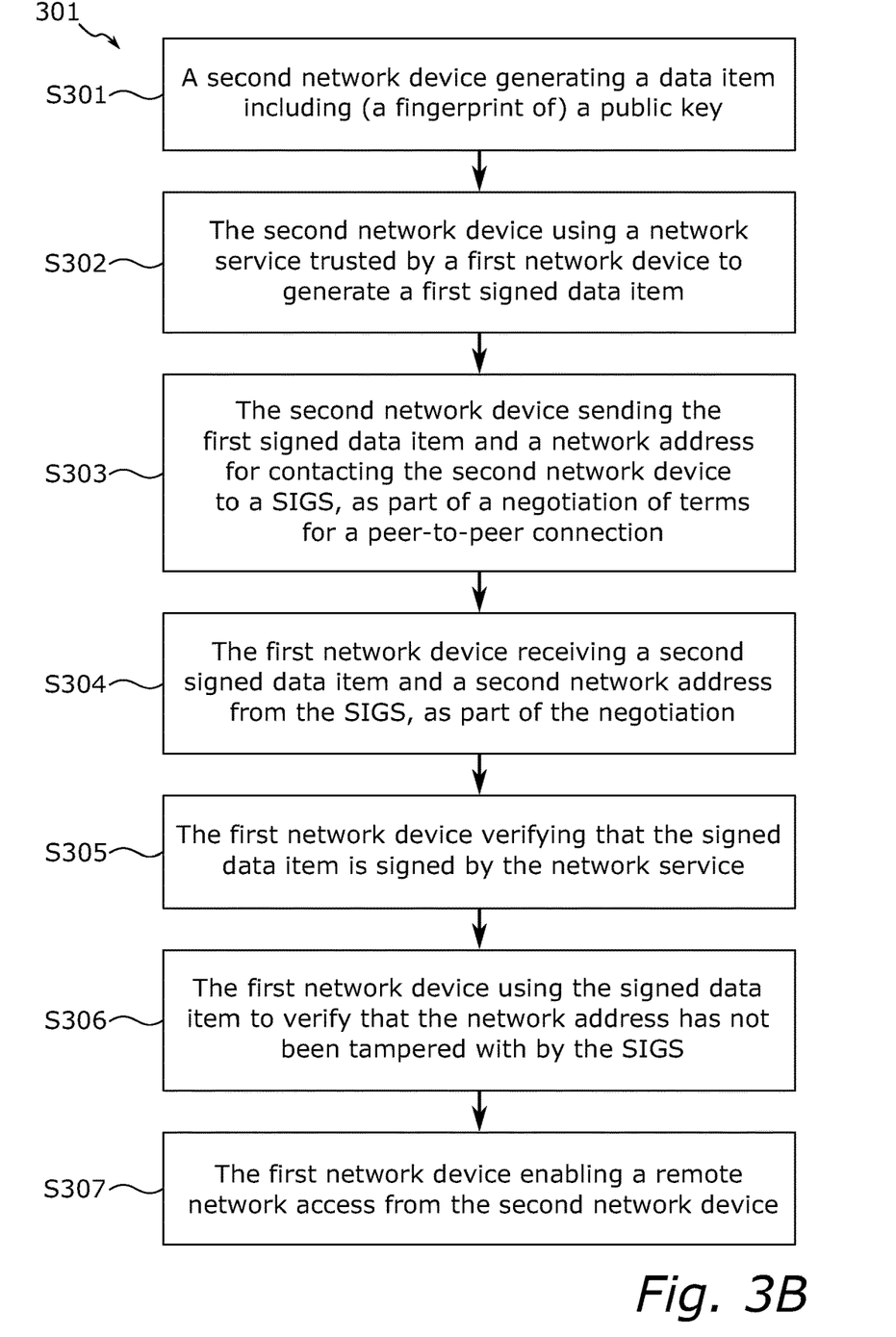

FIG. 3B schematically illustrates various steps in an embodiment of a method 301 according to the present disclosure, while FIG. 3A schematically illustrates a flow 300 of messages when performing the method 301. Herein, a "data item" is a piece of information, e.g., a collection of bits representing e.g., a message, a data blob, or similar. In particular, in a step S301 of the method 301, a data item 321 is obtained (e.g., generated) by the laptop 220, and made to include either one or both of a public key of the laptop 220 and a fingerprint of the public key of the laptop 220. A fingerprint of a key is for example the result of a hash-function being applied to the key. Herein term "hash-function" has its common meaning, namely something which takes an input and provides an (often smaller) output, where it is easy to check that a particular input generates a particular output, but where it is hard or impossible to deduce from the output alone what the input originally was. This may be useful e.g., in that the fingerprint may be much smaller than the full key, and in that it may easily be discovered if someone or something has been trying to tamper with the fingerprint as it then no longer corresponds to the originally input key.

After having generated the data item 321 including its public key (and/or the fingerprint of the public key), the laptop 220 sends (in a step S302 of the method 301) the data item 321 to the network service 260 using the connection 262, in a message 310. The network service 260 receives the message 310 including the data item 321, cryptographically signs the data item 321 and returns a message 320 including at least the signature 322. In other embodiments, the network service 260 may instead return a signed version of the data item 321 (i.e., both the data item 321 and the signature 322) in the message 320. In any way, after receiving the message 320 from the network service 260, the laptop 220 is in possession of a first signed data item 323, including both the signature 322 and the data item 321.

Using the SIGS 250 as an intermediate, the network camera 210 and laptop 220 then proceeds to negotiate terms for establishing a peer-to-peer connection between the network camera 210 and the laptop 220. The SIGS 250 is used to relay a plurality of messages 330 between the network camera 210 and the laptop 220 for this purpose. Although illustrated in FIG. 3A as the laptop sending the first message 332 of such messages, the opposite may also be true. For example, it is envisaged that the laptop 220 may (using some other channel of communication) contact the network camera 210 and ask the network camera 210 to start the negotiations by sending a connection request/offer to the laptop 220. However, for the sake of argument, it will here be assumed that it is the laptop 220 which initiates the negotiation of the connection terms. Also, it will also be assumed that the negotiation may include the network camera 210 and laptop 220 each sending multiple messages back and forth before the negotiation is over, and that the messages 332, 332', 334, 334' may each represent a plurality of messages. For ease of illustration, FIG. 3A however illustrates only a single message sent from each party to the other. It should also be assumed that the shown timeline may differ (that is, the message from the network camera 210 may for example be sent before the message from the laptop 220, and that e.g., the network camera may send multiple messages before receiving any messages from the laptop 220, and vice versa). Phrased differently, it is envisaged that the negotiation may take any form, and that the messages 330 may include any combination of messages sent back and forth between the network camera 210 and laptop 220 via the SIGS 250, in any particular arrangement in time. Consequently, when stating herein that something (such as a signing, receiving, reading, sending, etc.) of such a single message is performed, it is envisaged also that there may be multiple messages and that said something is done to at least one or all of the multiple messages, etc.

In any way, in a step S303 of the method 301, the laptop 220 sends one or more messages 332 to the SIGS 250. Normally, the SIGS 250 do not need to retrieve more information from the one or more messages 332 than who the addressee is, and can leave the remaining part of the one or more messages 332 untouched and even unread. This applies also to messages the SIGS 250 receives from the network camera 210 for forwarding to the laptop 220. The one or more messages 332 received from the laptop 220 may include e.g., one or more ICE candidates, one or more SDP answers and/or offers, etc. In particular, (at least one of) the one or more messages 332 include at least a first network address for contacting the laptop 220 (in order to e.g., establish a peer-to-peer connection with the laptop 220), found using e.g., a STUN server. At least one of the one or more messages 332 also include the first signed data item 323. The SIGS 350 sends, in a step S304 of the method 301, corresponding one or more messages 332' which are received by the network camera 210, the one or more messages 332' including at least a second signed data item 323' and a second network address 324'. This far in the method, it is not known whether the SIGS 250 has been tampering with the messages, and e.g., whether the first and second signed data items 323 and 323' are the same, and/or e.g., whether the first and second network addresses 324 and 324' are the same.

The network camera 210 can in turn send one or more own messages 334 to the SIGS 250 as part of the negotiation, such that the SIGS 250 can relay the one or more messages 334 by sending one or more corresponding messages 334' to the laptop 220. The one or more messages 334 can for example include a corresponding network address for contacting the network camera 210, etc. After the negotiation of the terms is finished, the SIGS 250 is no longer needed, and the network camera 210 and the laptop 220 can use the information about the respective other party achieved during the negotiation to establish the peer-to-peer connection 340.

Establishing the peer-to-peer connection 340 can form part of the network camera 210 enabling a remote access from the laptop 220 over the peer-to-peer connection 340. However, to avoid being subjected to a potential MITM attack if the SIGS 250 happens to be compromised, the envisaged method 301 and network system 200 includes the network camera 210 making use of the signed data item 323' received from SIGS 250. This procedure will now be described in more detail.

If the network camera 210 believes that the one or more messages 332' received from the SIGS 250 are the exact one or more messages 332 originally sent by the laptop 220 to the SIGS 250, the network camera 210 can go ahead and do its part of establishing the peer-to-peer connection 340 without any further consideration. The same applies to the laptop 220. However, the SIGS 250 may be compromised, and e.g., the one or more messages 332' may not necessarily correspond exactly to the one or more messages 332 originally sent from the laptop 332, and the first and second signed data items 323 and 323', as well as the first and second network addresses 324 and 324', may be different. The SIGS 250 may for example have replaced part or all of the one or more messages 332 before sending the one or more messages 332', in an attempt to trick the network camera 210 into establishing a peer-to-peer connection with the SIGS 250 instead of directly with the laptop 220, by making the second network address 324' a network address belonging to e.g., the SIGS 250 itself. Likewise, the SIGS 250 may alter the content of the one or more messages 334 received from the network camera 210 before sending the one or more messages 334' to the laptop 220, in order to trick the laptop 220 into establishing a peer-to-peer connection with the SIGS 250 instead of directly with the network camera 210. To prevent this from happening, or at least to detect if the SIGS 250 has been tampering with e.g., the message(s) 332 before sending the message(s) 332', the second signed data item 323 received from the SIGS 250 may however be used by the network camera 210 for verification purposes. In a step S305 of the method 301, the network camera verifies that the second signed data item 323' was in fact signed by the network service 260, by using e.g., a locally stored public key of the network service 260. In a step S306 of the method 301, the network camera 210 uses the second signed data item 323' to verify that second network address 324' received from the SIGS 250 originates from the laptop 220 and has not been tampered with by the SIGS 250. After the verifications S305 and S306 has succeeded, the network camera 210 may then, in a step S307 of the method 301, proceed with enabling a remote access from the laptop 220 via the established peer-to-peer connection 340.

Figure 3C:
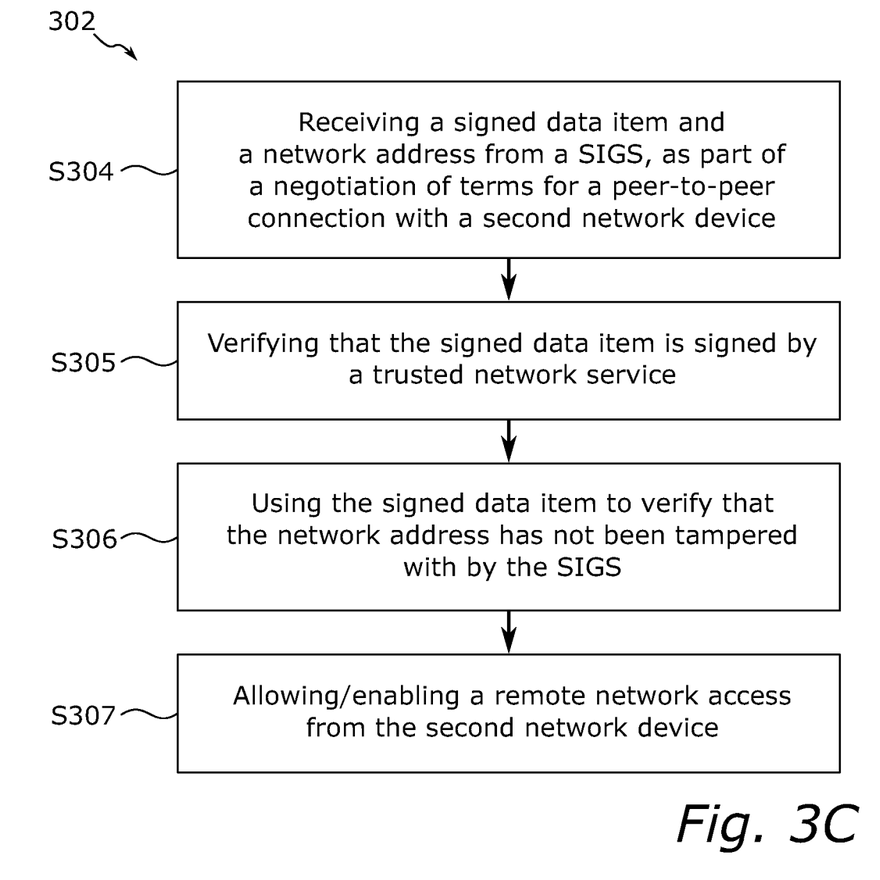
Figure 3D:
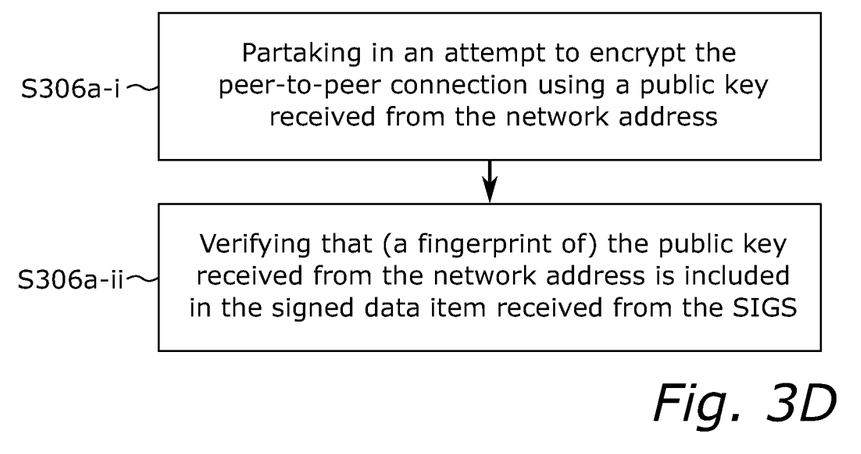
Figure 3E:
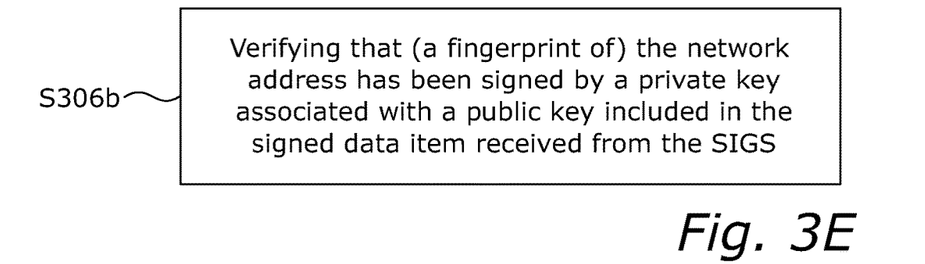

In what follows, with further reference to FIGS. 3C-3E, two proposals will now be presented, each including further details of how the second signed data item 323' received from the SIGS 250 may be used by the network camera 210 in the verification step S306 to avoid a MITM attack performed by the SIGS 250. Other such proposals are of course also possible, although not described in any more detail herein.

First, FIG. 3C schematically illustrates the flow of an embodiment of a method 302 which can be performed in/by the network camera 210. The steps of the method 302 correspond to the steps of the method 301 performed in the network camera 210, and their details does not need to be reiterated here once again.

FIG. 3D schematically illustrates envisaged sub-steps of the step S306 of the method 302, corresponding to a first proposal "A". In the proposal "A", both the network camera 210 and the laptop 220 may first establish a peer-to-peer connection with what they believe is the other peer before worrying about a potential MITM attack by the SIGS 250, including the network camera 210 establishing its part of a peer-to-peer connection with the second network address 234' received from the SIGS 250. It may, at this stage, not be ruled out that the "other peer" for both the network camera 210 and the laptop 220 is in fact the SIGS 250, and that e.g., the SIGS 250 have been tampering with the relayed messages 330 to e.g., make the second network address 324' equal a network address of its own. Without prejudice about any MITM so far, both the network camera 210 and the laptop 220 can then partake in an attempt to encrypt its respective peer-to-peer connection established with the "other peer" (or other "party", as the terms party and peer are used interchangeably herein if not stated to the contrary). This may include exchanging one or more security keys between the end-parts of the peer-to-peer connection(s). In a sub-step S306a-I of the step S306 of the method 302, this may include the network camera 210 may provide a public key of its own to the other peer of the connection (i.e., to the second network address 324'), while also receiving a public key of the other peer of the connection (i.e., from the second network address 324'). Likewise, the laptop may provide a public key of its own to its assumed other peer of the connection, while receiving a public key from its assumed other peer of the connection. The received public key from a particular other peer may be used to encrypt data before sending it to the particular other peer, and the particular other peer may use its corresponding private key to decrypt the data, etc. Such a procedure of encryption is assumed to be well-known to the skilled person, and may for example include the use of established protocols such as Transport Layer Security (TLS, as described in e.g., RFC 8446 or any extensions thereto as published by the IETF), Datagram TLS (DTLS, as described in e.g., RFC 6347 or related publications by the IETF), etc.

Importantly, in a sub-step S306a-ii of the step S306 of the method 302, the laptop 220 may verify that the public key it receives from the second network address 324' is also included in the second signed data item 323' received from the SIGS 250. Alternatively, if the second signed data item 323' instead (or in addition) includes a fingerprint of a public key, the network camera 210 can verify that a fingerprint of the public key received from the second network address 324' is the fingerprint included in the second signed data item 323'. By first having verified (in step S305 of the method 302) that the second signed data item 323' was in fact signed by the trusted network service 260, the network camera 210 may with great confidence assume that the data item 321 including the public key of the laptop 220 has not been tampered with by the SIGS 250, and that the second signed data item 323' is the same as the first signed data item 323 of the laptop 220, and that the second network address 324' is the same as the first network address 324 for contacting the laptop 220. This because if the laptop 220 uses its public key for the encryption of what it believes is the peer-to-peer connection to the network camera 210, the public key (or at least a fingerprint thereof) of the laptop 220 will be included in the second signed data item 323' the network camera 210 receives from the SIGS 250.

As a result, the network camera 210 may know if the public key received from the assumed other peer (i.e., from the second network address) is the public key of the laptop 220, and then also know if the assumed other peer is in fact the laptop 220 or if it is e.g., the SIGS 250 attempting to perform a MITM attack. If verifying that the public keys (or at least their fingerprints) match, and that the peer-to-peer connection is the peer-to-peer connection 340 directly with the laptop 220, the network camera 210 may then go ahead and allow/enable the remote access from the laptop 220 over the peer-to-peer connection 340 in the step S307 of the method 302. If not being able to verify that the public keys (or their fingerprints) match, the network camera 210 may assume that something is wrong, that e.g., the SIGS 250 has tried to tamper with the one or more messages 332', and that a remote access should not be allowed as it cannot be made sure that something like the SIGS 250 is not acting as a MITM. The network camera 210 can then for example respond with an error message, drop the established peer-to-peer connection, or do both. Other alternatives are for example also possible, but not further elaborated on herein. Proposal "A" may for example be particularly advantageous in that the public key of the laptop 220 is already available for encryption purposes (it may be e.g., a TLS or DTLS encryption key), and in that the same public key may be used also to prevent the SIGS 250 performing and succeeding with its MITM attack without a need to generate further public/private key pairs.

FIG. 3E schematically illustrates a sub-step of the step S306 of the method 302 according to another, second proposal "B". In the proposal "B", the laptop 220 may select to cryptographically sign at least a part of the one or more messages 332 which it sends to the SIGS 250. The signing is performed using a private key associated with the public key of the laptop 220 which is included in the data item 321 and the signed data item 323 (herein, "associated" implies that the public key and private key form part of a same public/private key pair). The laptop 220 may for example sign at least a part of the one or more messages 332 wherein the network address 324 is provided. After having received the one or more messages 332' from the SIGS 250, the network camera 210 can use the second signed data item 323' received from the SIGS 250 to, in a sub-step S306*b* of the step S306 of the method 302, verify that (at least a fingerprint of) the second network address 324' has been signed by a private key associated with a public key included in the second signed data item 323'. By so doing, the network camera 210 can check whether the received message(s) 332' from the SIGS 250 are the same as the message (s) 332 originally sent to the SIGS 250 from the laptop 220, or if the message(s) have been tampered with by the SIGS 250. The SIGS 250 may, for example, have tried to replace the first network address of the laptop 220 by its own second network address, but as the signature of that part of the message(s) 332 will then no longer match the content of the message(s) (or the signature will have to be updated by the SIGS 250), the network camera 210 can detect such a tampering attempt. If tampering is discovered by the network camera 210, the network camera 210 can chose e.g., not to establish the peer-to-peer connection at all. This proposal is particularly beneficial in that the tampering attempt can be detected by the network camera 210 even before the (or any) peer-to-peer connection has been established between the network camera 210 and any address assumed belonging to the laptop 220.

It is assumed that the above proposals "A" (and the corresponding sub-steps S306*a*-i and S306*a*-ii) and "B" (and the corresponding sub-step S306*b*) may be implemented one at a time, or both at a time, by the network camera 210 as part of the method 302 (and consequently as part of the method 301).

In some envisaged embodiments, the network service 260 can also be used to provide an authorization and/or an authentication of the laptop 220, such that the network camera 210 may know whether the laptop 220 should be allowed the remote access or not. For example, the message 310 sent from the laptop 220 to the network service 260 may include (or be complemented by, in another message not illustrated in FIG. 3) a request for an access token. The network service 260 may check whether the laptop 220 should be provided access to the network camera 210, and if the answer is affirmative the network service 260 may generate and return such an access token back to the laptop 220. The access token may for example be inserted in the data item 321 and co-signed together with the public key of the laptop 220. The first signed data item 323 may then include also the (signed) access token, and the network camera 210 may verify that the access token received in the signed data item 333 from the SIGS 250 is in fact signed by the particular network service 250, and then allow access to the network camera 210 from the laptop 220. This because the network service 260 is assumed to be trusted by the network camera 210. It should be noted that the access token is not necessarily needed to prevent MITM attacks but can serve as additional info regarding whether the laptop 220 is authorized/authenticated. The data item may for example be a Java Web Token (JWT) or similar, and may contain e.g., the public key of the laptop 220, the signature of the network service 260, and possibly also the access token (if used). If JWTs are already used for e.g., authorization and/or authentication of e.g., the laptop 220, implementing and including the public key (or fingerprint thereof) in the already available and used JWT may prevent the need for further data structures and reduce the number of data variables exchanged. Other ways of specifying the format of the data item are of course also possible. The data item 321 may for example be the access token itself, if the public key of the laptop 220 is included within the access token, etc.

Figure 3F:
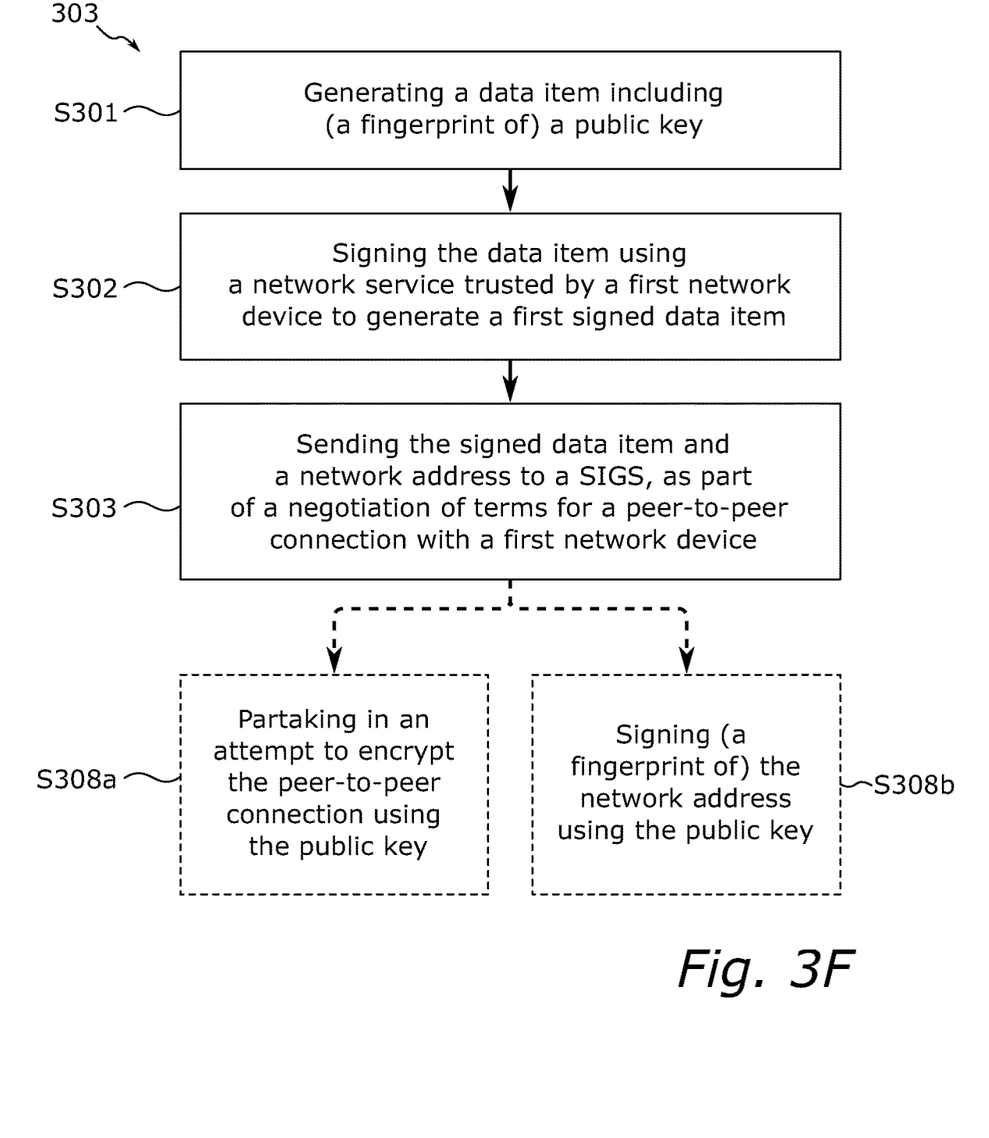

FIG. 3F illustrates an embodiment of a method 303 which may be performed in/by the laptop 220. The steps S301-S303 of the method 303 correspond to the same steps S301-S303 of the method 301 described with reference to FIG. 3B, and their details will therefore not be reiterated here once again. FIG. 3F further illustrates two optional sub-steps S308*a* and S308*b* which may also be performed by the laptop 220 as part of the method 303 (and as part of the method 301 described with reference to FIG. 3B). It is envisaged that e.g., only one of the sub-steps S308*a* and S308*b* are performed, or that both sub-steps S308*a* and S308*b* are performed. The sub-step S308*a* includes the laptop 220 partaking in an attempt to encrypt the peer-to-peer connection with the assumed network camera 210. The laptop 220 then uses the public key for which at least the fingerprint is included in the first signed data item 323. This allows, as described earlier herein, the network camera 210 to verify that a MITM attack is not performed by the SIGS 250 once the peer-to-peer connection has been established and the encryption thereof is attempted. In the sub-step S308*b*, the laptop 220 signs (at least a fingerprint of) at least a part of the one or more messages 332 in which the first network address 324 is included. As described earlier herein, this allows the network camera 210 to check, before having to establish the peer-to-peer connection to the second network address 324', that the second network address 324' has not been tampered with by the SIGS 250, and that the second network address 324' corresponds to the first network address 324 for contacting the laptop 220.

In all embodiments envisaged herein, the standard for streaming e.g., data from the network camera 210 to the laptop 220 may follow e.g., the standard known as Web Real-Time Connect (WebRTC), which already relies on a signalling service (SIGS) for establishing peer-to-peer connections between e.g., a network camera and a browser (running on the laptop or similar) in which e.g., a video stream from the network camera is to be consumed. As the proposed solution herein only includes providing an additional item in the data item (that is, including the public key, or fingerprint of the public key, of the laptop 220) in the communication performed between the network camera 210 and laptop 220 via the SIGS 250, the practice of WebRTC can still be followed while implementing the method proposed herein. In particular, WebRTC specifies the use of SDP messages to negotiate e.g., session and connection terms, and these SDP messages are well suited to include the additional data required for the signed data item discussed herein, without negatively impacting other parts of the WebRTC procedure.

Envisaged herein is also to provide one or more computer programs. One such computer program may for example be for performing the method 301 in a network system, for performing the method 302 in a network device in form of e.g., a network camera, and/or for performing the method 303 in a network device in form of e.g., a user device (laptop, tablet, smartphone, wearable device, desktop computer, etc.) A computer program may for example correspond to the instructions stored in the memory 232 of one or both of the network devices 210 and 220, such that the corresponding method is performed by the network device when the processor (or processing circuitry) executes the instructions. In other envisaged embodiments, the computer programs may be in a form not yet readable by the processor, but rather be provided as e.g., text according to a programming language, which text needs to be compiled to a format readable by the processor, e.g., by using a thereof suitable compiler. The compiler may of course be executed by the processor itself, or even form part of the processor itself for real-time compilation. Envisaged herein is also to provide one or more computer program products. Each such computer program product includes a computer readable storage medium on which one or more of the above-mentioned computer programs are stored. For example, one computer program product may include the computer program for performing the method 301, the computer program for performing the method 302, and/or the computer program for performing the method 303, as described earlier herein. As used herein in the present disclosure, a (computer-readable) storage medium (e.g., a "memory") may e.g., be any combination of random-access memory (RAM) and read only memory (ROM). In some embodiments, the computer readable storage medium may be transitory (e.g., an electric signal readable by the processor). In other embodiments, the computer readable storage medium may be non-transitory (e.g., in form of a non-volatile memory, such as a hard disk drive (HDD), a solid-state drive (SSD), a secure digital (SD) card or similar, a USB flash drive, or similar such as any combination of magnetic memory, optical memory, solid-state memory, or even remotely mounted memory. Other types of computer readable storage mediums are also envisaged, as long as their functionality allows to store the computer program such that they are readable by the processor and/or by an intermediate compiler. As also used herein in the present disclosure, a "processing circuitry" or "processor" may for example be any combination of one or more of a suitable central processing unit (CPU), multiprocessor, microcontroller, digital signal processor (DSP), application specific integrated circuit (ASIC), field-programmable gate-array (FPGA), etc., capable of executing software instructions stored in the memory.

In summary of the various embodiments presented herein, the present disclosure provides an improved way of enabling a remote access to e.g., a network camera from e.g., a user device. This because: a) the user device (e.g., a laptop) provides a data item including something "personal" to the user device, such that for example (a fingerprint of) a public key of the user device; b) the data item is signed by a network service trusted by the network camera, such that the SIGS may not tamper with the data item without the network camera knowing; c) the user device attempts to transfer the signed data item to the network camera via the SIGS, as part of a negotiation of terms for a peer-to-peer connection between the network camera and the user device, and d) as the data item includes something personal to the user device, the network camera can use this personal something to verify that the SIGS has not attempted to tamper with the messages relayed during the negotiation in order to perform a MITM attack. This because the public key of the user device may be used by the user device to e.g., i) sign a proposed network address for contacting the user device transferred to the network camera during the negotiation, such that the network camera can notice if this network address has been tampered with by the SIGS, and/or to ii) encrypt the peer-to-peer connection, such that the network device may know whether a public key offered from the proposed network address it receives as part of the negotiation is really a public key of the user device, and not e.g., a public key of the SIGS. These various solutions as envisaged herein provides an easy way to avoid potential MITM attacks by the SIGS, without requiring any substantial modifications of either the network camera and/or the user device.

Although features and elements may be described above in particular combinations, each feature or element may be used alone without the other features and elements or in various combinations with or without other features and elements. Additionally, variations to the disclosed embodiments may be understood and effected by the skilled person in practicing the claimed disclosure, from a study of the drawings, the disclosure, and the appended claims.

In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

LIST OF REFERENCES 110, 210 first network device (network camera)
120, 220 second network device (laptop, user device)
130 first LAN
131 second LAN
132, 133 first and second firewalls
134, 135 first and second NAT devices
136 common network (e.g., the Internet)
140, 240 peer-to-peer (P2P) connection between first and second network devices
141, 142 malicious P2P connections to SIGS
150, 250 signaling service (SIGS)
200 network system
230 processor
232 memory
234 network interface
236 additional items
238 communication bus
260 trusted network service
300 message flow
301 method performed in/by network system
302 method performed in/by first network device
303 method performed in/by second network device
321 data item
322 signature
323, 323' first and second signed data items
324, 324' first and second network addresses 330 negotiation messages
332 messages from second network device to SIGS
332' messages from SIGS to first network device
334 messages from first network device to SIGS
334' messages from SIGS to second network device

The invention claimed is:

1. A method of enabling a remote network access to a first network device from a second network device, comprising:
   a) the second network device generating a data item including at least one of a public key of the second network device and a fingerprint of the public key;
   b) the second network device using a network service to cryptographically sign the data item to generate a corresponding first signed data item, wherein that the first signed data item is signed by the network service is verifiable by the first network device;
   c) the first network device and the second network device performing, via an intermediate signalling service, SIGS, a negotiation of terms for establishing a peer-to-peer connection, including the second network device sending, in one or more messages to the SIGS, the first signed data item and a first network address for connecting to the second network device, and including the first network device receiving, in one or more messages from the SIGS, a second signed data item and a second network address, and
   d) the first network device enabling the remote network access from the second network address over the peer-to-peer connection using the negotiated terms, after first:
      d-i) verifying that the second signed data item is signed by the network service, and
      d-ii) using the second signed data item to verify that the second network address is the first network address and has not been tampered with by the SIGS.

2. The method according to claim 1, wherein step d) includes the first network device partaking in an attempt to encrypt the peer-to-peer connection using a public key received from the second network address, and wherein step d-ii) includes the first network device verifying that the public key received from the second network address, and/or a fingerprint of the public key received from the second network address, is included in the second signed data item received from the SIGS.

3. The method according to claim 2, wherein the encrypting is performed using Datagram Transport Layer Security, DTLS, and wherein the public key received from the second network address is a DTLS public key.

4. The method according to claim 1, including the second network device signing at least a part of the one or more messages sent to the SIGS, and/or at least part of a fingerprint of the at least a part of the one or more messages sent to the SIGS, using a private key associated with a second public key of the second network device, and wherein step d-ii) includes the first network device verifying that at least a part of the one or more messages received from the SIGS, and/or at least part of a fingerprint of the at least a part of the one or more messages received from SIGS, has been signed using a private key associated with a public key included in the second signed data item.

5. The method according to claim 1, including providing the remote network access using Web Real-Time Connect, WebRTC, wherein the one or more messages include at least a Session Description Protocol, SDP, answer and/or offer, and the first network address is an Interactive Connectivity Establishment, ICE, candidate.

6. The method according to claim 5, wherein the data item is, includes, or is complemented by an access token provided and also signed by the network service in order to authorize and/or authenticate the second network device, and wherein step d) includes the first network device verifying that the access token is, is included in, or complements the second signed data item received from the SIGS.

7. A network device, comprising:
   a processor, and
   a memory storing instructions that, when executed by the processor, cause the network device to:
      negotiate terms for a peer-to-peer connection between the network device and a second network device via an intermediate signalling service, SIGS, including to receive, in one or more messages from the SIGS, a signed data item and a network address, and
      enabling a remote network access from the network address over the peer-to-peer connection using the negotiated terms, including to first:
         verify that the signed data item received from the SIGS is signed by a network service trusted by the network device, and
         use the signed data item received from the SIGS to verify that the network address received from the SIGS has not been tampered with by the SIGS.

8. The network device according to claim 7, wherein the instructions further cause the network device to partake in an attempt to encrypt the peer-to-peer connection using a public key received from the network address, and to allow the remote network access from the network address after first also verifying that the public key received from the network address, and/or that a fingerprint of the public key received from the network address, is included in the signed data item received from the SIGS.

9. The network device according to claim 7, wherein the instructions further cause the network device to verify that at least a part of the one or more messages received from the SIGS including the network address, and/or that a fingerprint of the at least a part of the one or more messages received from the SIGS including the network address, has been signed using a private key associated with a public key included in the signed data item received from the SIGS.

10. A network device, comprising:
    a processor, and
    a memory storing instructions that, when executed by the processor, cause the network device to:
       generate a data item including at least one of a public key of the network device and a fingerprint of the public key;
       use a network service to cryptographically sign the data item to generate a corresponding signed data item, wherein that the signed data item is signed by the network service is verifiable by a second network device;
       negotiate terms for a peer-to-peer connection between the network device and the second network device via an intermediate signalling service, SIGS, including to send, in one or more messages to the SIGS, the signed data item and a network address for contacting the network device.

11. The network device according to claim 10, wherein the instructions further cause the network device to partake in an attempt to encrypt the peer-to-peer connection using the public key.

12. The network device according to claim 10, wherein the instructions further cause the network device to sign at least a part of the one or more messages including the network address, and/or to sign a fingerprint of the at least a part of the one or more messages including the network address, using a private key associated with the public key.

13. The network device according to claim 10, wherein the instructions further cause the network device to use the network service to let the signed data item be, include, or be complemented by, an access token signed by the network service to authorize and/or authenticate the network device to the second network device.

14. A network system, including a first network device and a second network device, and configured to enable a remote network access to the first network device from the second network device according to a method, comprising:
   a) the second network device generating a data item including at least one of a public key of the second network device and a fingerprint of the public key;
   b) the second network device using a network service to cryptographically sign the data item to generate a corresponding first signed data item, wherein that the first signed data item is signed by the network service is verifiable by the first network device;
   c) the first network device and the second network device performing, via an intermediate signalling service, SIGS, a negotiation of terms for establishing a peer-to-peer connection, including the second network device sending, in one or more messages to the SIGS, the first signed data item and a first network address for connecting to the second network device, and including the first network device receiving, in one or more messages from the SIGS, a second signed data item and a second network address, and
   d) the first network device enabling the remote network access from the second network address over the peer-to-peer connection using the negotiated terms, after first:
   d-i) verifying that the second signed data item is signed by the network service, and
   d-ii) using the second signed data item to verify that the second network address is the first network address and has not been tampered with by the SIGS.

15. The network system according to claim 14, wherein the first network device is a network camera, and wherein the remote access includes streaming a video feed from the network camera to the second network device.

* * * * *